United States Patent
Ferreira et al.

(10) Patent No.: US 11,748,216 B2
(45) Date of Patent: *Sep. 5, 2023

(54) VOTING OF TRIPLE REDUNDANT CIRCULAR DATA

(71) Applicant: Gulfstream Aerospace Corporation, Savannah, GA (US)

(72) Inventors: Sergio Ferreira, Savannah, GA (US); Joshua Lindsay, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/664,745

(22) Filed: May 24, 2022

(65) Prior Publication Data

US 2022/0283913 A1 Sep. 8, 2022

Related U.S. Application Data

(63) Continuation of application No. 16/583,665, filed on Sep. 26, 2019, now Pat. No. 11,392,462.

(51) Int. Cl.
   *G06F 11/18* (2006.01)
   *G06F 17/18* (2006.01)

(52) U.S. Cl.
   CPC .......... *G06F 11/187* (2013.01); *G06F 11/182* (2013.01); *G06F 17/18* (2013.01)

(58) Field of Classification Search
   CPC ...... G06F 11/187; G06F 11/182; G06F 17/18; G06F 11/188; G06F 11/1004
   USPC ....................................... 709/201
   See application file for complete search history.

(56) References Cited

U.S. PATENT DOCUMENTS

| | | | |
|---|---|---|---|
| 5,894,473 A | 4/1999 | Dent | |
| 6,088,663 A | 7/2000 | Wang | |
| 8,654,823 B1 | 2/2014 | Zhu et al. | |
| 2009/0326739 A1* | 12/2009 | Goupil | G05B 23/0235 318/565 |
| 2010/0152929 A1 | 6/2010 | Manfred et al. | |
| 2011/0041607 A1* | 2/2011 | Kuroda | G01C 25/00 73/504.12 |
| 2012/0272206 A1 | 10/2012 | Sengupta et al. | |
| 2013/0191681 A1 | 7/2013 | Mitchell et al. | |
| 2018/0224885 A1 | 8/2018 | Liang et al. | |
| 2019/0307345 A1 | 10/2019 | Weiss et al. | |
| 2019/0335273 A1 | 10/2019 | Kato et al. | |

FOREIGN PATENT DOCUMENTS

| | | |
|---|---|---|
| CN | 104677360 A | 6/2015 |
| CN | 108008434 A | 5/2018 |
| EP | 3327534 A2 | 5/2018 |
| EP | 3327534 A3 | 6/2018 |
| WO | 9529434 A1 | 11/1995 |

* cited by examiner

*Primary Examiner* — James C Kerveros
(74) *Attorney, Agent, or Firm* — LKGlobal | Lorenz & Kopf, LLP

(57) ABSTRACT

The voter circuit and method determines a voted output among plural inputs each carrying circular data. To supply the voted output, a statistical average (e.g., mean or median) is computed by grouping the plural inputs into pairs, and for each pair generating a minimum angular difference by selecting the minimum of (a) the absolute difference between the pairs of inputs, and (b) the conjugate of the absolute difference between the pairs of inputs. The voted output is a statistical average generated from the minimum angular difference.

8 Claims, 10 Drawing Sheets

US 11,748,216 B2

VOTING OF TRIPLE REDUNDANT CIRCULAR DATA

CROSS-REFERENCE TO RELATED APPLICATION

This application is a continuation of U.S. patent application Ser. No. 16/583,665, filed Sep. 26, 2019, and issued on Jul. 19, 2022 as U.S. Pat. No. 11,392,462, which is incorporated herein by reference in its entirety.

TECHNICAL FIELD

The disclosure relates generally to voting and monitoring of redundant data sources using a scheme to determine a best value and to detect erroneous sources of data. More particularly the disclosure relates to voting and monitoring where the data are circular in nature—having a discontinuity point where the data wraps between maximum and minimum values.

BACKGROUND

This section provides background information related to the present disclosure which is not necessarily prior art.

Aircraft control systems frequently rely on multiple sources of redundant data. These sources need to be monitored for integrity and voted to provide a single consolidated value to be used for control purposes. Typical monitoring schemes include error determination by measurement of the absolute difference between sources. Typical voting schemes include averaging or mid-value selection.

Certain types of data commonly found in aircraft applications are circular in nature. Circular data are data like seconds on an analog clock, or the bearings on an analog compass, which exhibit a discontinuity point where the values suddenly jump from a maximum value to a minimum value, or vice versa, as the discontinuity point is crossed. On an analog clock, the discontinuity lies at the boundary between 60 seconds and 0 seconds; on an analog compass, the discontinuity lies at the boundary between 360 degrees and 0 degrees. These are of course just examples. There are other instances where circular data may be encountered. For example, in a typical aircraft control system, circular data may be used to represent bank angle, heading, longitude, and so forth. For this type of data, typical voting and monitoring schemes don't work around the discontinuity point.

There are alternative number systems that can be employed to address the discontinuous nature of circular data. For example, the quaternion numbering system is sometimes used to eliminate the discontinuity of circular data. However, to achieve this advantage, the quaternion numbering system employs an extended set of complex numbers (i, j and k complex components) and requires the rules of algebra to be changed (e.g., multiplying 2×3 using quaternion math does not yield the same answer as multiplying 3×2). To handle the extended complex components and the changes in the rules of algebra, more complex (and time consuming) computer resources are required. Even if quaternion numbering is not adopted, conventional solutions still require copious use of trigonometric functions (sin, cos, etc.) that demand significant computational resources. In aircraft control applications, it may not be feasible to burden the sensor and control systems with this computational load, particularly where multiple, redundant sources of data are being utilized. Thus a better solution is needed.

SUMMARY

The disclosed voter mechanism (e.g., programmed processor or logic circuit) and method that determines a voted output among plural inputs each carrying circular data using techniques that do not have the above disadvantages. A processor is programmed to compute a statistical average of the plural inputs (i.e., mean or median, depending on the number of valid inputs). The statistical average is computed by grouping the plural inputs into pairs and for each pair generating a minimum angular difference by selecting the minimum of: (a) the absolute difference between the pairs of inputs, and (b) the conjugate of the absolute difference between the pairs of inputs. This minimum angular difference of each pair is then collectively used to generate the statistical average (mean or median), and the generated statistical average then serves as the voted output.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

When working with redundant data, there are two important data processing components: the monitor circuit and the voter circuit. The monitor circuit assesses the integrity of each redundant data source, and the voter circuit uses the redundant sources to provide a single consolidated (voted) value to be used for control purposes. Examples of both the monitor circuit and the voter circuit are described herein.

Figure 1A:
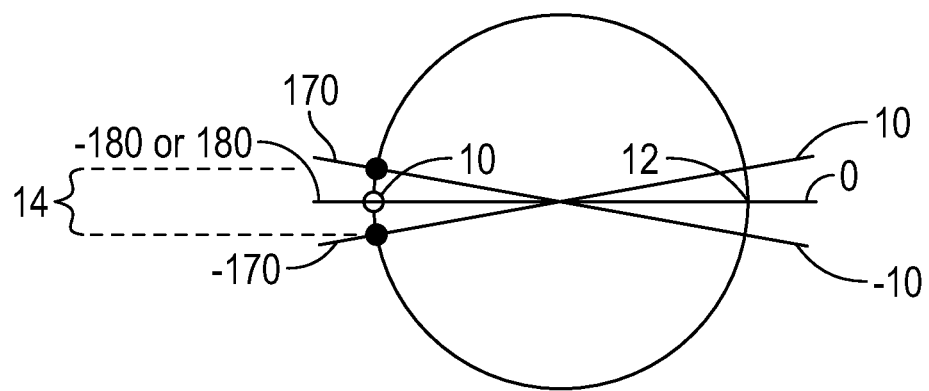
FIGS. 1a and 1b are circular data examples useful in understanding the context in which the disclosed voting and monitoring system works.
Figure 1B:
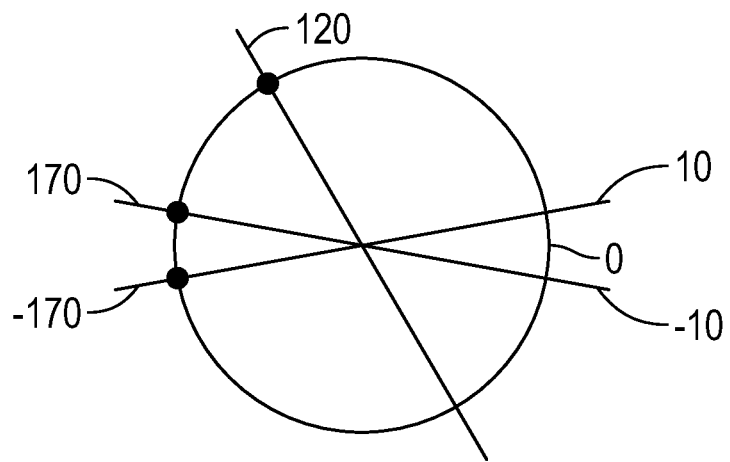

Referring to FIGS. 1a and 1b, two examples of circular data are presented to illustrate some of the difficulties encountered when implementing monitoring schemes or voting schemes. FIG. 1a depicts a case where the average of two data points at +170 and −170 degrees, respectively, would have a physical average midway between the two points, as shown at reference numeral 10, which corresponds to an angular position of +180 or −180 degrees. However, the arithmetic average of +170 and −170 is 0 (zero), which lies on the other side of the circle at reference numeral 12. This illustrates one problem with performing simple arithmetic on circular data.

The angular error, reference numeral 14, between the +170 and −170 data points is 20 degrees. However arithmetically, the absolute difference between these points yields a much larger angular error:

$$|+170-(-170)|=340.$$

Clearly, the arithmetically calculated error of 340 degrees is much larger than the actual angular error of 20 degrees. This illustrates another problem with performing simple arithmetic on circular data.

FIG. 1b shows a second example in which the middle value is angularly positioned at +170 degrees. However when the three values are sorted in an increasing order (−170, 120, 170), the middle value is 120 degrees. Again, clearly there is a significant difference between 170 degrees and 120 degrees.

The illustrated embodiment is designed to handle three redundant input sources, thus the voter circuits and monitor circuits have been termed triplex circuits that operate upon triplex data sources or signals. The techniques described here can be extended to cover other situations where there are different numbers of redundant input sources. Thus the triplex embodiments described here are merely exemplary of techniques that can be applied to other cases where different numbers of redundant signals need to be monitored and voted upon. In a typical aircraft application, the algorithms disclosed here may be performed by suitably programming the aircraft onboard flight control computer. Of course, if desired, dedicated logic gates or dedicated processor(s) may be used instead.

Figure 9:
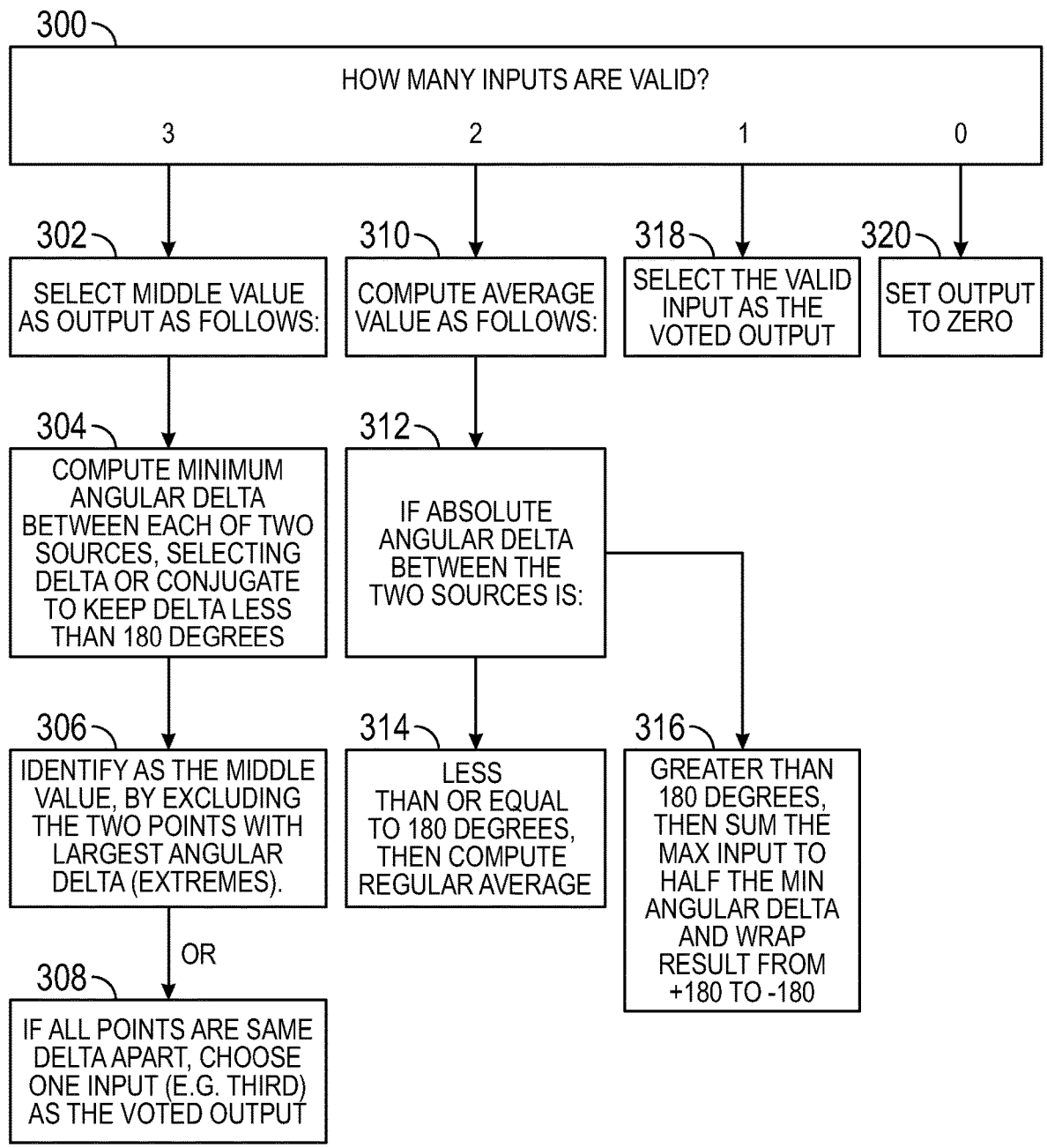
FIG. 9 is a flowchart illustrating how the triplex voter for circular data computes the voted data from three sources.
Figure 10:
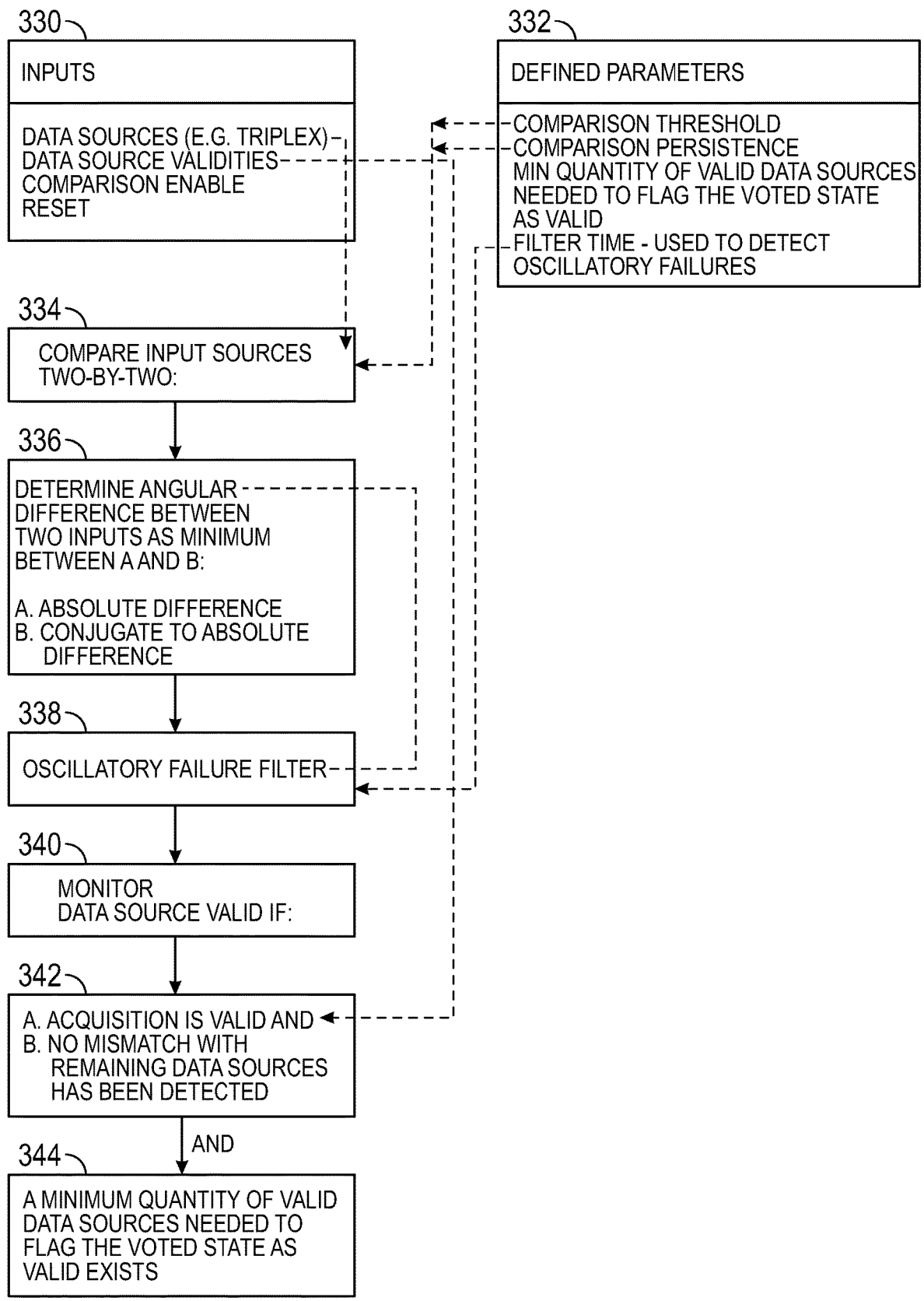
FIG. 10 is a flowchart illustrating how the triplex monitor for circular data operates.

Before giving a detailed disclosure of the voter and monitor circuits, an overview of the respective voter and monitor method will be presented with reference to FIGS. 9 and 10.

Overview of Triplex Voter for Circular Data

Referring to FIG. 9, the triplex voter for circular data computes the voted data from three sources as follows:
  a) If three inputs are valid (at 300), the mid-value (middle data) of the three valid inputs is selected at 302 by the following algorithm:
    As at 304, the minimum angular delta between each of two sources is computed. The minimum angular delta is computed as the minimum between the absolute difference between two sources and its conjugate angle (i.e., to 360 degrees, such that the minimum angular delta is always an angle lower than 180 degrees). Note, this technique of using the conjugate angle, as appropriate, is used elsewhere in the process to compute the minimum angular delta, as will be apparent from the figures and accompanying description that follows.
    Given three points in a circumference, the two points with the largest angular delta between them are the extremes, while the mid-value is the third point, as at 306.
    For the undefined case where the three points are 120 degrees apart, one of the inputs is selected, as at 308.
  b) If two inputs are valid (at 300), the average of the two valid inputs is computed at 310, as follows:
    If the absolute angular difference between the two sources at 312 is less or equal to 180 degrees, as at 314, then a regular average is computed.
    If the absolute angular difference between the two sources at 312 is greater than 180 degrees (as at 316), then the average is computed by summing the maximum input to half the minimum angular delta between the two sources. This result is wrapped from +180 to −180 (i.e., 360 degrees is subtracted from it) if it's greater than 180 deg.
  c) If only one input is valid, then the valid input is selected, as at 318.
  d) If no input is valid, the output is set to zero, as at 320.

Overview of Triplex Monitor for Circular Data

Referring to FIG. 10, the Triplex Monitor for Circular Data has the following inputs 330:
  Three data sources
  Three data source validities
  A comparison enable input, used to enable/disable the monitor
  A reset input, used to clear a latched failure when it's no longer persistent The Triplex Monitor for Circular Data has the following parameters 332 that are defined depending on the data that's being monitored:
  A comparison threshold
  A comparison persistence
  The minimum quantity of valid data sources needed to flag the voted data as valid
  A filter time, used to filter differences between sources and to detect oscillatory failures.

The triplex monitor for circular data compares data two-by-two 334 to determine the difference between each input pair. A comparison threshold and a comparison persistence time will be defined for each data type.
  The angular difference 336 between two inputs is defined as the minimum between the following two values:
  The absolute difference between the two sources;
  The conjugate to the absolute difference between the two sources (i.e., 360 degrees minus the absolute difference between the two sources).

The monitor includes the capability of detecting oscillatory failures by low-pass filtering 338 the difference of the two inputs prior to comparing the filtered difference against a threshold. A low-pass filter cut-off frequency will be defined for each data type.

The monitor determines the validity 340 of the voted data versus a minimum number of valid data sources. The minimum number of valid data sources will be defined for each data type.

The monitor considers a data source to be valid if its acquisition is valid and no mismatch with the remaining data sources with valid acquisition has been detected as at 342, and a minimum quantity of valid data sources needed to flag the voted state as valid exists at 343.

Triplex Voter for Circular Data

Figure 2:
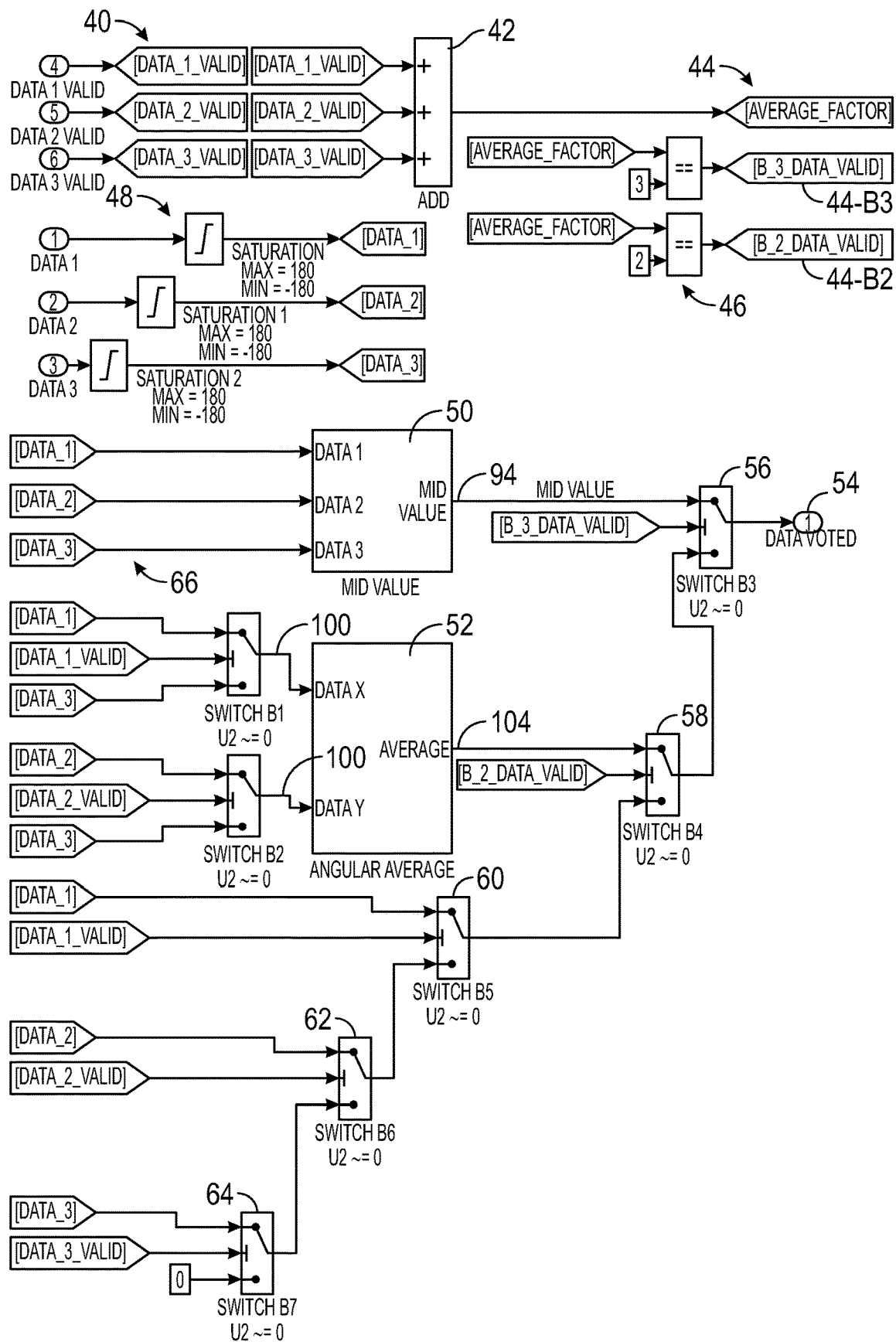
FIG. 2 is a block diagram illustrating a triplex voter for circular data.

Referring to FIG. 2, a logic circuit for implementing a triplex voter circuit for circular data is illustrated. This logic circuit may be implemented by programming a processor to perform the logic steps illustrated. In this regard, FIG. 2 depicts the logic in a form suitable for expressing as a Matlab Simulink model, in which case the executable program code may be generated using the code generation tools within Matlab Simulink. It will be appreciated that Matlab Simulink is merely one example of a model based software development environment. Other alternatives exist, such as SCADE. The Matlab Simulink embodiment described here is merely exemplary and is not intended as a limiting scope of the disclosure. Alternatively this logic circuit may be implemented as an application specific integrated circuit (ASIC) or using a field programmable gate array (FPGA).

In some implementations, the redundant (triplex) data may be supplied as signals, inputs or data that have been assessed by a monitor circuit or other means for labeling each of the redundant inputs as valid or invalid. By way of example, an invalid signal might represent that the sensor supplying the signal has been turned off or has malfunctioned, or that the lead assigned to carry the signal is not reporting data. Where the monitor circuit or other validity checking circuit provides a data valid/invalid indication, that information is supplied to the Data Valid inputs (one for each of the three triplex signals) as at 40. As illustrated, these Data Valid states are added at 42 and the sum is used as an Average Factor, which is then parsed by logic gates 46 to determine if all three inputs are valid (B_3_Data_Valid), or if two inputs are valid (B_2_Data_Valid). In the illustrated example of FIG. 2, the case of only one input being valid is not tested for—having only a single input valid does not require voting.

As shown at 48, the triplex circular data are each processed by a saturation function that bound the data between +180 degrees and −180 degrees. This is done to ensure that all circular values are expressed relative to a common circle as illustrated in FIGS. 1a and 1b. After processing the data values through the saturation function, the data are voted upon to determine from the redundant triplex signals, the one Data Voted value selected by the voter circuit as being most representative of the collective triplex group.

Voting is performed, as illustrated in FIG. 2 by computing the mid value of the triplex inputs as at 50, and by also computing the average of a subset of the triplex inputs as at 52. As illustrated, SwitchB1 and SwitchB2 provide the two valid data sources at 100 when there are only two valid data sources. Mid value selection is detailed in FIG. 3, and angular average calculation is detailed in FIG. 4, both discussed below. In these figures certain switches have been illustrated; these switches work generally as follows: When the controlling input is TRUE, then the top input is used. When the controlling input is FALSE, then the bottom input is used. In the figures these switches have been drawn in a state assuming the controlling input is TRUE. The output of the voting circuit produces the Data Voted signal at 54, which output is based on how switches 56-64 are set. As illustrated switch 56 (SwitchB3) toggles to provide to the Data Voted output, either the Mid Value selected by the mid value selection block 50 and the output of switch 58 (SwitchB4). Switch toggles between these two settings based on the state of the 44-B3 output of logic gates 46. By examining the circuit of FIG. 2 it can be seen that each of the remaining switches 58-64 perform in a similar fashion. Switches 60, 62 and 64 select the valid remaining source when only one source is valid. Switch 64 sets the output to zero when there are no valid sources. The table below summarizes these toggle selection switches. When the Controlled By signal is TRUE, the output of the switch is as noted in the Unswitched Output column. When the Controlled By signal is FALSE, the output of the switch is as noted in the Switched Output column.

| Switch Ref. No. | Switch Name | Unswitched Output | Controlled By | Switched Output |
|---|---|---|---|---|
| 56 | SwitchB3 | Mid Value | B_3_Data_Valid | SwitchB4 |
| 58 | SwitchB4 | Average | B_2_Data_Valid | SwitchB5 |
| 60 | SwitchB5 | Data_1 | Data_1_Valid | SwitchB6 |
| 62 | SwitchB6 | Data_2 | Data_2_Valid | SwitchB7 |
| 64 | SwitchB7 | Data_3 | Data_3_Valid | 0 |

Figure 3:
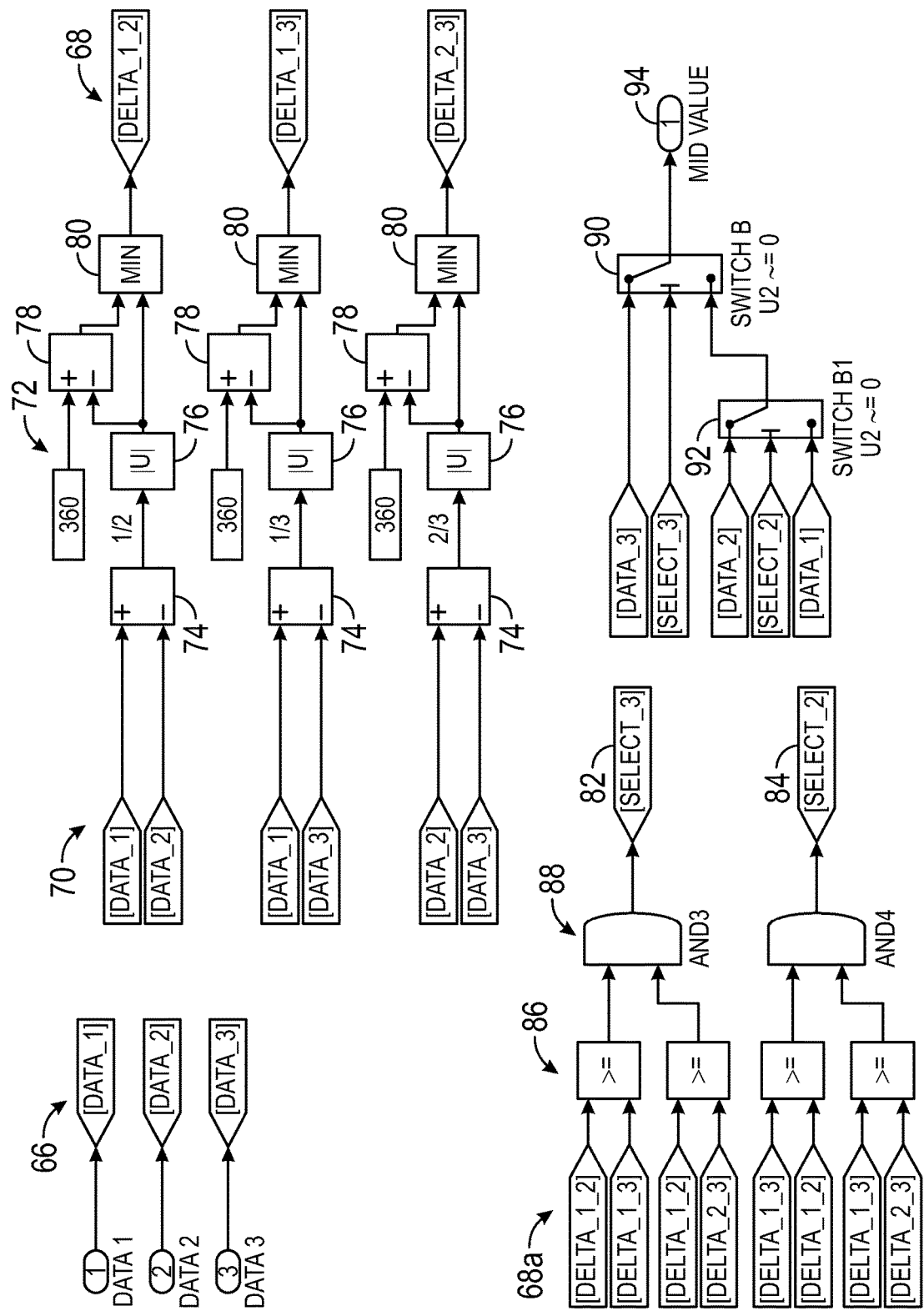
FIG. 3 is a block diagram illustrating a triplex voter for circular data making a mid-value selection.

With reference now to FIG. 3, the mid value selector circuit 50 (FIG. 2) will be further described. The selector circuit 50 operates on input data supplied at 66 (also shown in FIG. 2). The selector circuit operates by computing the difference, or delta, between respective pairs of the input values. As illustrated three pairs of data values are used to compute three delta outputs at 68, namely (Data_1, Data2), (Data_1, Data3) and (Data2, Data3), as depicted at 70. The calculation or processing blocks for each pair of input values is performed using the same algorithm, as illustrated in block diagram form at 72. The algorithm subtracts the two input values at 74, computes the absolute value of the difference, as at 76 and then subtracts the resultant absolute value from 360 degrees as at 78 to obtain a conjugate angle. The absolute value from 76 and the conjugate angle at 78 are then compared at 80 to select the minimum of the two. This minimum is reported at the delta outputs at 68.

Next the delta outputs are further processed at 68a to compute two intermediate selector values, [Select_3] at 82 and [Select_2] at 84. As illustrated these selector values are computed using a greater than or equal to comparison at 86, followed by a Boolean AND gate function 88. These intermediate selector values control switch 90 (SwitchB) and switch 92 (SwitchB1) to generate the Mid Value resultant at 94 (the output of circuit 50 (FIG. 2). Switches 90 and 92 are summarized in the table below.

| Switch Ref. No. | Switch Name | Unswitched Output | Controlled By | Switched Output |
|---|---|---|---|---|
| 90 | SwitchB | Data_3 | [Select_3] | SwitchB1 |
| 92 | SwitchB1 | Data_2 | [Select_2] | Data_1 |

Figure 4:
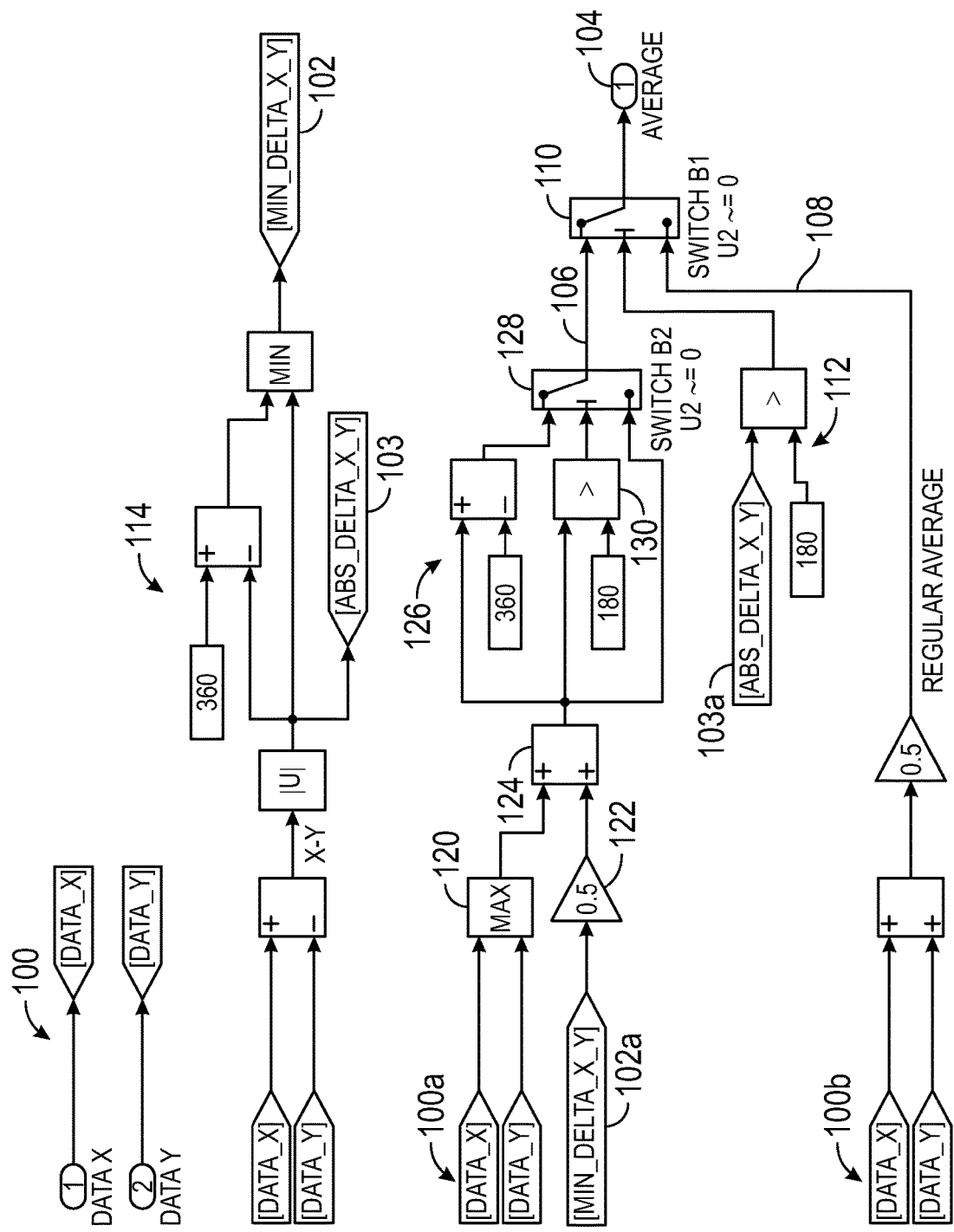
FIG. 4 is a block diagram illustrating a triplex voter for circular data generating an angular average.

With reference now to FIG. 4, the average calculation circuit 52 (FIG. 2) will be further described. The average calculation circuit 52 operates on input data (Data_X and Data_Y) supplied at 100 (also shown in FIG. 2). The average calculation circuit generates the Average value 104 (also shown in FIG. 2) by computing both an angular average 106 and a regular average 108 and then selecting one of the two averages based on whether the absolute difference or delta between the input data are greater than 180 degrees. In the circuit of FIG. 4, this selection between the two averages is performed by switch 110 (SwitchB1), with the absolute delta between the Data_X and Data_Y being tested as greater than 180 degrees at 112.

To perform these calculations, the calculation circuit processes the two input values 100 (Data_X and Data_Y) to generate two intermediate signals, a minimum delta value, (Min_Delta_X_Y) as at 102 and an absolute delta value (Abs_Delta_X_Y) as at 103. The minimum delta value 102 is calculated using logic gates and calculation circuitry at 114 that functions essentially the same as the components 74-80 of FIG. 3, and the absolute delta value is calculated using logic gates and calculation circuitry, as illustrated. As can be seen from FIG. 4, these minimum delta and absolute delta values are used at 102a and 103a to assist in generating the average value at 104.

Specifically, the average value is derived from a first component that takes the minimum delta value at 102a and the absolute delta value at 103a into account, and a second component that is based solely on the regular average of the Data_X and Data_Y input values as at 100b. The first component is calculated by selecting the maximum of the Data_X and Data_Y values at 120, and by then adding this maximum to one-half of the minimum delta value derived at 122 in adder 124. The resultant calculation is then processed by circuitry 126 to address the circular data issue. Circuitry 126 operates by using switch 128 to select the output of adder 124 directly, if its value is less than or equal to 180 degrees as at 130, or to select the output of adder 124 reduced by 360 degrees if the adder output value is greater than 180 degrees.

Meanwhile the Data_X and Data_Y values at 100b are used to calculate the regular average at 108 by simple arithmetic computation of one-half the sum of the two values.

The average calculation circuit operates through switch 110 to select the angular average 106 as the average value at 104, unless the absolute delta 103a is less than or equal to 180 degrees, in which case switch 110 selects the regular arithmetic average 108 as the average value at 104. Thus the average calculation circuit performs a piecewise calculation that uses the regular arithmetic average in cases where the absolute delta (absolute difference) between the two input values are less than or equal to 180 degrees; otherwise the calculation uses the larger of the two input values, increased by one-half the difference or delta between the two, with adjustment made to subtract 360 degrees if needed to ensure that the resultant value does not exceed one full circle of rotation.

Triplex Monitor for Circular Data

Figure 5:
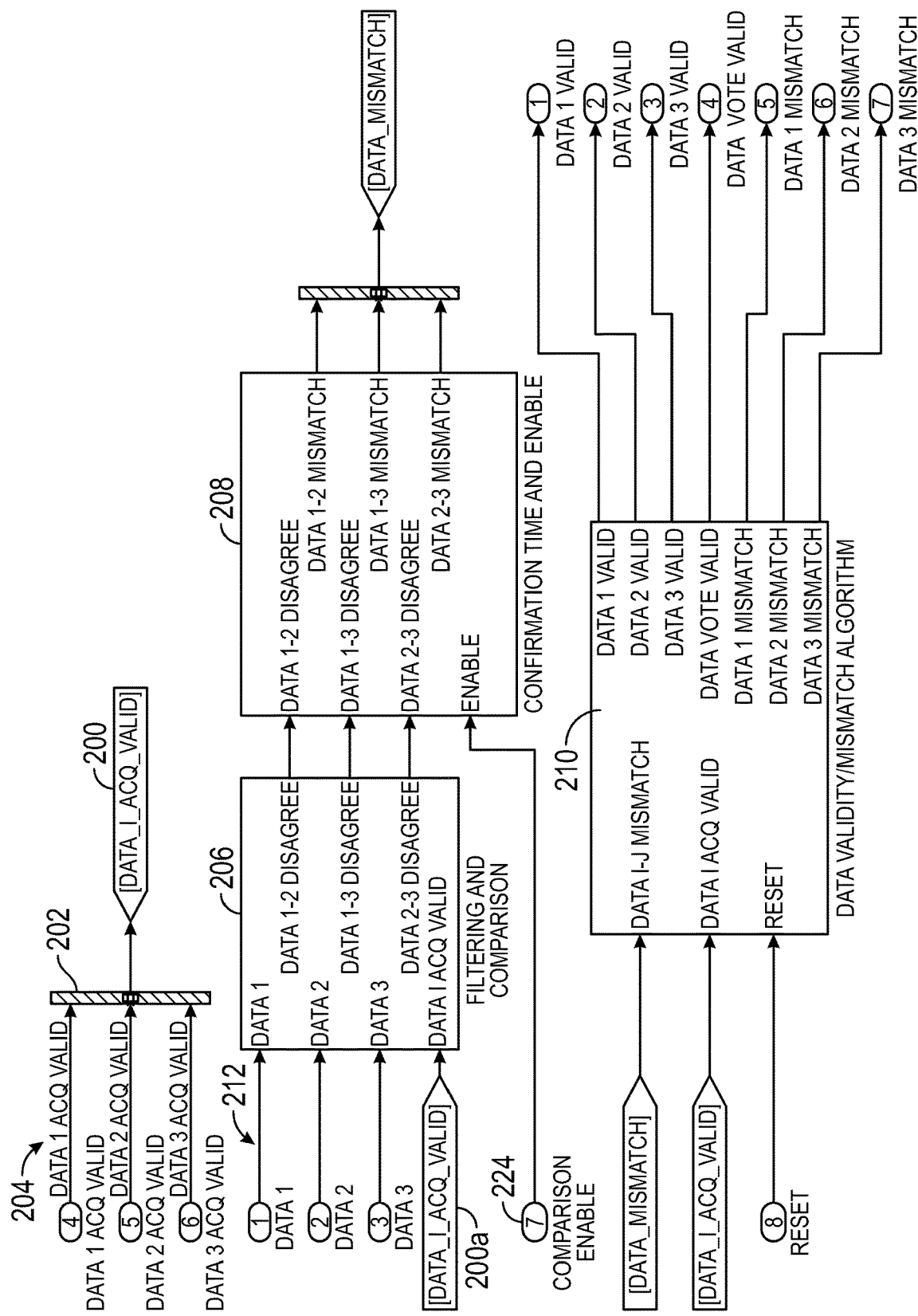
FIG. 5 is a block diagram of a triplex monitor for circular data.

Referring to FIG. 5, a logic circuit for implementing a triplex monitor circuit for circular data is illustrated. This logic circuit may be implemented by programming a processor to perform the logic steps illustrated. In this regard, FIG. 5 depicts the logic in a form suitable for expressing as a Matlab Simulink model, in which case the executable program code may be generated using the code generation tools within Matlab Simulink. As noted above, other development environments may be used instead. Alternatively this logic circuit may be implemented as an application specific integrated circuit (ASIC) or using a field programmable gate array (FPGA).

As discussed above in connection with the voter circuit, in some instances it may be known a priori that a certain signal or signals are not valid because, for example, the sensor supplying the signal has been turned off or has malfunctioned, or that the lead assigned to carry the signal is not reporting data. The monitor circuit can make use of this information, treating invalid signal cases from the outset as a case where not all acquired data are valid. However, in the more likely case where all acquired data exist and appear to be valid, the monitor circuit uses this condition as a switching or selecting value (shown at 200 and designated Data_i_Acq_Valid). This Data_i_Acq_Valid value or condition is used in some of the circuits described below. As used herein, the vertical bus 202 represents the fact that the output side of the bus at 200, labeled Data_i_Acq_Valid, carries all information supplied on the input side of the bus at 204. In this case, because we are dealing with triplex data, there are three input side values that carry through to the output. In this case, the inputs recite the validity conditions of each of three data values Data_1_Acq_Valid, Data_2_Acq_Valid, and Data_3_Acq_Valid.

Figure 7:
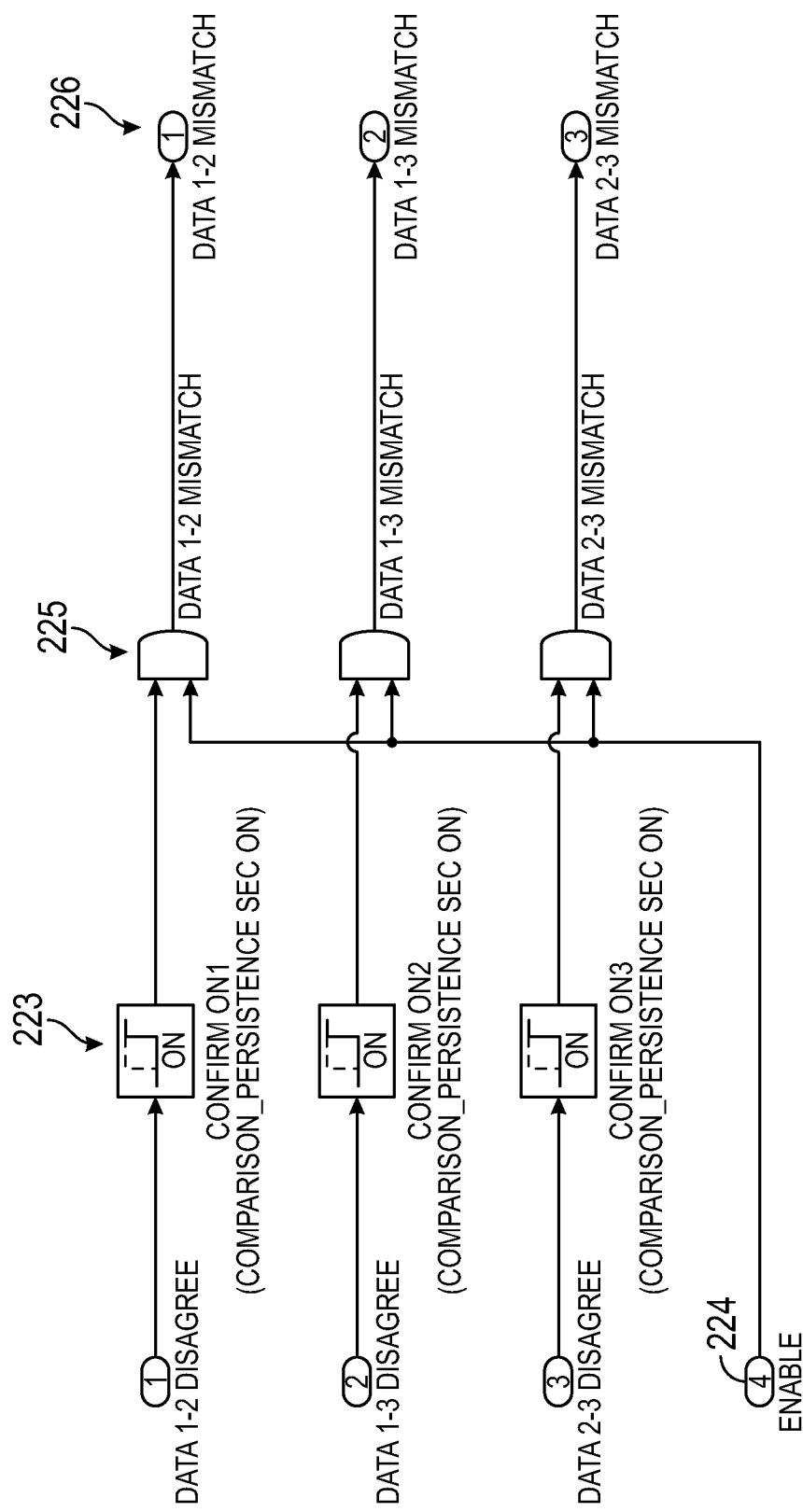
FIG. 7 is a block diagram of a triplex monitor for circular data performing confirmation timing and enablement.
Figure 8:
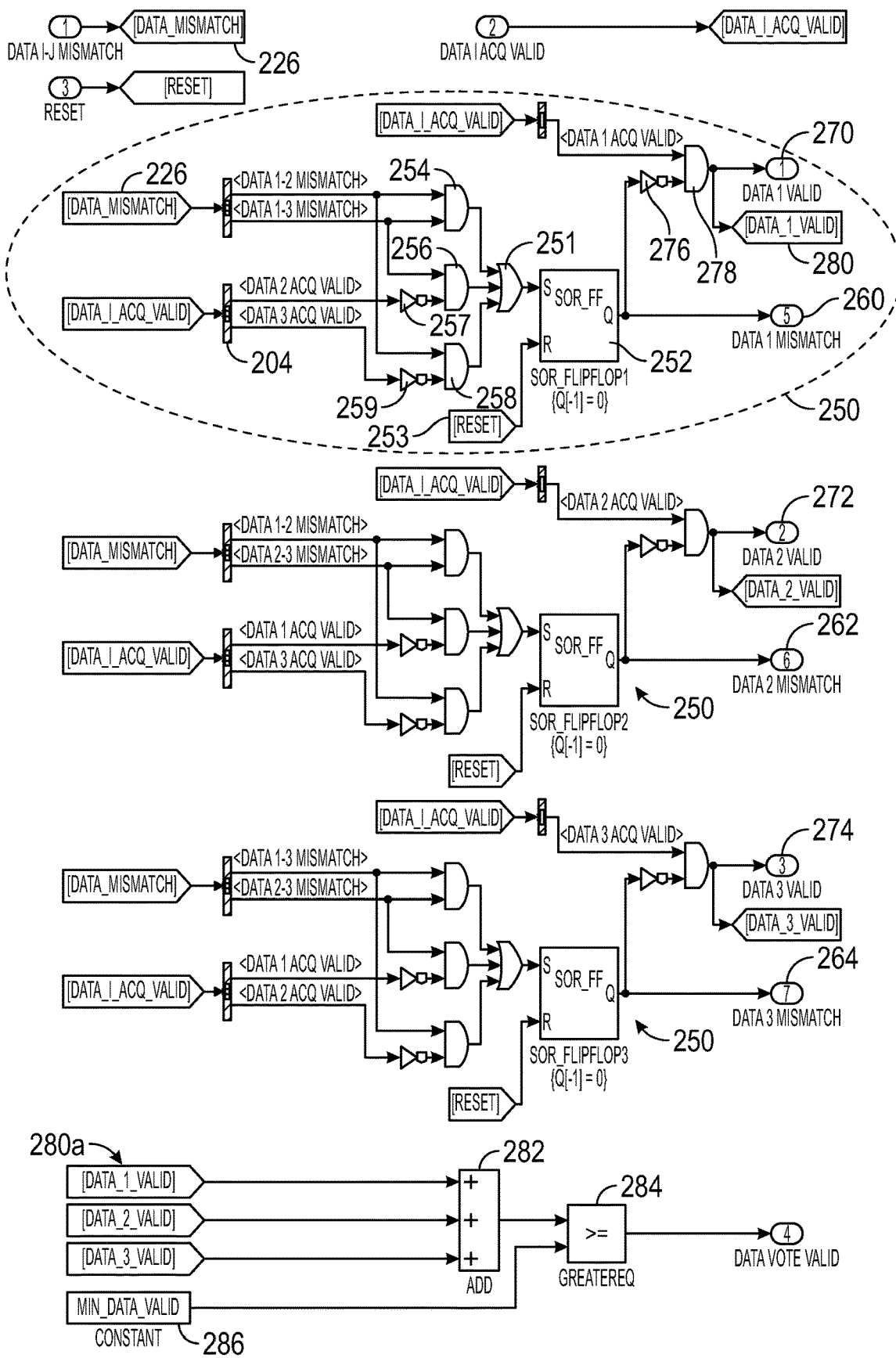
FIG. 8 is a block diagram of a triplex monitor for circular data implementing the data validity-mismatch algorithm.

The monitor circuit of FIG. 5 comprises three major functional components, a filtering and comparison component 206 (shown in more detail in FIG. 6), a confirmation time and enable component 208 (shown in more detail in FIG. 7) and a data validity/mismatch algorithm 210 (shown in greater detail in FIG. 8). Note that the Data_i_Acq_Valid bus condition serves as one of the inputs to component 206, as at 200a. The triplex data values are also input to component 206 as at 212. The function of the filtering and comparison circuit 206 is to determine which pairs of the triplex data inputs 212 disagree. The confirmation time and enable circuit, when enabled assesses whether the data is in disagreement for a predetermined time, thus ruling out cases where the data may disagree for only a brief time interval. In instances where the data mismatch persists for a sufficient time, the data validity/mismatch algorithm assesses which of the triplex data are valid and which are responsible for the data mismatch.

Figure 6:
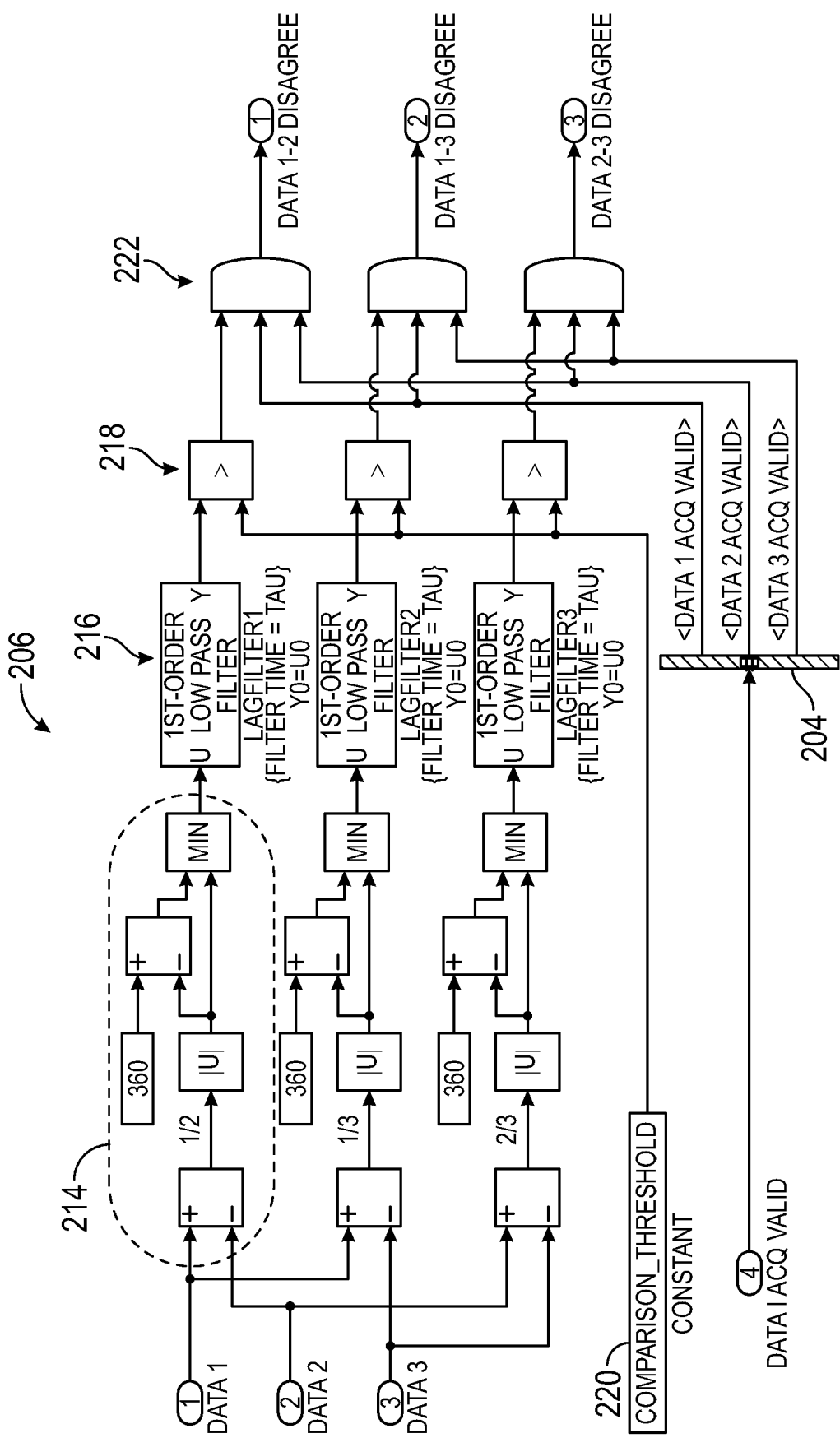
FIG. 6 is a block diagram of a triplex monitor for circular data performing filtering and comparison.

Referring to FIG. 6, the filtering and comparison component 206 first processes each of the triplex inputs (Data 1, Data 2, Data 3) to determine if there is a difference or delta between any two inputs. This function is performed using processing components 214, which are configured and function essentially the same as components 74-80 in FIG. 3. Components 214 compare pairs of inputs: Data 1 vs Data 2, Data 1 vs Data 3 and Data 2 vs Data 3, as illustrated.

The results of these comparisons are each processed through a filter 216, such as a first-order low pass filter designed to avoid nuisance trips of the monitor and allow the monitor to detect oscillatory failures. The filter time constants are set to screen out momentary differences due to signal glitches. Such glitches can occur, for example, due to random signals and noise picked up by associated signal lines or generated by associated electronic circuitry. The low pass filter circuit also functions to detect oscillatory failures which would otherwise be undetectable at sufficiently high frequencies where the miscomparison lasts for a shorter duration than the monitor persistence time. The filter time constant also determines the amplitude of an oscillatory miscomparison required at a given frequency to trip the monitor.

Next, the low-pass-filtered signals are each compared at 218 with a predetermined threshold value supplied as a constant signal level at 220. This comparison essentially decides if two data values are in agreement or not. However, such comparison is only meaningful if both of the compared input data values were not previously deemed invalid by information on bus 202 (FIG. 5). Thus AND gate 222 is provided to declare that two data values are in disagreement only if the two data value sources are valid, per bus 204, AND the two data values differ in value above a predetermined threshold 220, as determined at 218.

The confirmation time and enable circuit 208 is shown in FIG. 7. This circuit functions to ensure that decision of disagreement between any two values is persistent. Persistence time is established by blocks 223. For a data pair mismatch to be deemed as established, the mismatch condition must persist for at least the predetermined persistence time. The circuit also functions as a master enable/disable circuit responding to the enable signal at 224 (also shown in FIG. 5). The outputs of persistence time blocks 223 and the enable signal are coupled through AND gates 225 to provide the Data_Mismatch signals 226.

Turning now to FIG. 8, the Data-Mismatch signals 226 are further processed through latching circuits 250. As illustrated, three latching circuits 250 are utilized, one to produce a signal at 260 indicating that Data 1 is a mismatch vis-à-vis Data 2 and Data 3. The other two latching circuits 250 produce a signal at 262 and 264, respectively. Signal 262 indicates a Data 2 mismatch; signal 264 indicates a Data 3 mismatch. The three latching circuits 250 are essentially identical, so only one will be described in detail here.

In detail, the latching circuit 250, producing the Data 1 mismatch signal 260, comprises an OR gate 251 fed with three inputs discussed below. If any one or more of these inputs presents a logical TRUE state, the TRUE state is fed to the set terminal S of set-reset flip-flop 252, which holds the TRUE state on its output Q, until the flip-flop 252 is reset by a signal on the reset terminal R as at 253. When both the set and reset signals are present simultaneously, the effect of the set signal prevails. The flip-flop 252 may thus be viewed as performing the equivalent function as a computer memory device or computer memory circuit.

The three inputs to the OR gate 251 are supplied by three AND gates 254, 256 and 258, which process the Data Mismatch signal 226 and Data_i_Acq_Valid signals 201 (FIG. 5) as follows.

AND gate 254 supplies a logical TRUE state to OR gate 251 if both of the following conditions are met: mismatch signal 226 presents a Data 1-2 Mismatch condition, and a Data 1-3 Mismatch condition. The sources of these mismatch conditions can be seen in FIG. 7.

AND gate 256 supplies a logical TRUE state to OR gate 251 if both the Data 1-3 Mismatch condition is met and the Data_1_Acq_Valid signal is NOT TRUE. The NOT TRUE condition is decoded by providing the logic inverter gate 257.

Similarly, AND gate 258 supplies a logical TRUE state to OR gate 251 if both the Data 1-2 Mismatch condition is met and the Data_3_Acq_Valid signal is NOT TRUE. The NOT TRUE condition is decoded by providing the logic inverter gate 259.

The latching circuit 250 also provides Data Valid output signals 270, 272 and 274, respectively, for each of the three inputs 48 (FIG. 2). As illustrated, the Data Valid output signal is generated by inverting the output Q of flip-flop 252 at 276 and combining that logic state with the Data_1-Acq_Valid state for the relevant input in AND gate 278. As illustrated at 280 and 280*a*, these Data_Valid states are added with the corresponding outputs of the other two latching circuits (250) at 282 and compared at 284 against a minimum data valid constraint 286 to report that the data vote is valid if the sum of the three Data_Valid states 282 is greater than or equal to the minimum data value constraint 286.

In one embodiment, the plural inputs to the voter circuit as described above are preconditioned by the monitor circuit described above, to inhibit invalid inputs from being considered by the voter circuit.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A monitor circuit for assessing the validity among plural inputs each carrying circular data comprising:
   a comparison processor programmed to compare the plural inputs two-by-two to establish the validity of each input by grouping the plural inputs into pairs and for each pair generating a minimum angular difference by selecting the minimum of:
   (a) an absolute difference between the pairs of inputs, and
   (b) a conjugate of the absolute difference between the pairs of inputs; and
   wherein the processor is further programmed to test each generated minimum angular difference with a predetermine threshold to declare a pair to be in disagreement if the minimum angular difference for that pair exceeds the predetermined threshold;
   wherein the processor is further programmed to assess and declare invalid an input that is in disagreement with all other inputs paired against the input being assessed; and
   wherein the processor is programmed to filter the absolute value of the error between the pairs of inputs prior to comparing the filtered difference against a threshold and thereby apply an oscillatory failure detection filter in computing the absolute difference between pairs of inputs to ascertain how many of the plural inputs are valid;
   the oscillatory failure detection filter screening out momentary differences due to signal glitches and detecting oscillatory failures which would otherwise be undetectable at sufficiently high frequencies where a miscomparison lasts for a shorter duration than a monitor persistence time.

2. The monitor circuit of claim 1 wherein the processor is further programmed to assess and declare invalid an input that is in disagreement with all other inputs paired against it for a predetermined persistence time.

3. The monitor circuit of claim 1 further comprising a memory circuit that stores at least one of the assessed validity state and assessed invalidity state for each input.

4. The monitor circuit of claim 1 further comprising an input circuit receiving for each of the plural inputs a predetermined acquisition valid state selected from the group consisting of data acquisition valid and data acquisition invalid, and wherein the processor is further programmed to declare invalid an input for which the corresponding acquisition valid state reflects a data acquisition invalid condition.

5. A monitor method for assessing the validity among plural inputs each carrying circular data comprising:
   comparing the plural inputs two-by-two to establish the validity of each input by grouping the plural inputs into pairs and for each pair generating a minimum angular difference by selecting the minimum of:
   (a) an absolute difference between the pairs of inputs, and
   (b) a conjugate of the absolute difference between the pairs of inputs; and
   testing each generated minimum angular difference with a predetermine threshold to declare a pair to be in disagreement if the minimum angular difference for that pair exceeds the predetermined threshold; and
   declaring invalid an input that is in disagreement with all other inputs paired against the input;
   wherein the absolute difference is computed by:
   by filtering the absolute value of the error between the pairs of inputs prior to comparing a filtered difference against a threshold to ascertain how many of the plural inputs are valid, and screening out momentary differences due to signal glitches and oscillatory failures which would otherwise be undetectable at frequencies where a miscomparison lasts for a shorter duration than a monitor persistence time.

6. The monitor method of claim 5 further comprising an assessment to declare invalid an input that is in disagreement with all other inputs paired against it for a predetermined persistence time.

7. The monitor method of claim 5 further comprising storing in a memory circuit at least one of the assessed validity state and assessed invalidity state for each input.

8. The monitor method of claim 5 further comprising receiving for each of the plural inputs a predetermined acquisition valid state selected from the group consisting of data acquisition valid and data acquisition invalid, and declaring invalid an input for which the corresponding acquisition valid state reflects a data acquisition invalid condition.

\* \* \* \* \*